United States Patent [19]

Williams

[11] 4,039,817
[45] Aug. 2, 1977

[54] MICROSCOPE LAMP ASSEMBLY

[76] Inventor: Robert W. Williams, 3201 S. Maryland Parkway, Las Vegas, Nev. 89109

[21] Appl. No.: 633,608

[22] Filed: Nov. 20, 1975

[51] Int. Cl.² .......................................... F21V 33/00
[52] U.S. Cl. .................................. 240/2 MA; 240/47
[58] Field of Search ..................... 240/2 MA, 47, 52.1, 240/41.15

[56] References Cited

U.S. PATENT DOCUMENTS

| | | | |
|---|---|---|---|
| 2,627,019 | 1/1953 | Weiskopf | 240/2 MA |
| 2,667,103 | 1/1954 | Silge | 240/2 MA |
| 2,727,435 | 12/1955 | Ferrari | 240/2 MA |
| 2,730,923 | 1/1956 | Gorham et al. | 240/2 MA |
| 2,909,652 | 10/1959 | Pratt | 240/41.15 X |
| 3,523,724 | 8/1970 | Lancor | 240/47 X |
| 3,911,266 | 10/1975 | Oram | 240/52.1 |

Primary Examiner—Richard L. Moses

[57] ABSTRACT

In an operation microscope, an improved high intensity illumination lamp assembly comprises a high intensity lamp, a lamp base member, a lamp housing member for receiving the lamp and to which the base member is mounted, and having a plurality of orifices communicating with the interior lamp housing cavity and an opening through which the lamp extends, a fan for drawing air through the housing member orifices for cooling the lamp, and a conduit extending between the housing member and the fan.

7 Claims, 3 Drawing Figures

MICROSCOPE LAMP ASSEMBLY

BACKGROUND OF THE INVENTION

Although operation microscopes used in performing microsurgical techniques have been provided with illumination devices, those utilized heretofore are not satisfactory for many procedures. Specifically, widely used microscopes such as the Zeiss Opmi 1 may be provided with 30 watt or 50 watt filament lamps mounted in a lamp housing assembly. However, a major, if not critical disadvantage with such illumination systems is their failure to provide sufficient light for deep cavity surgery. Sufficient illumination is especially important in chest, back or abdominal surgery, which, due to the nature of the incision, requires significant light. For example, in deep disc surgery, conducted through a one inch long incision which is nominally four inches deep, the dark muscle walls absorb much light, and the shadows may substantially mask or otherwise hinder clear observation of the desired operative area.

Another important adjunct to microscopic surgery is the desirability to photograph, and especially record on motion picture film, video tape or televise the procedure. Although a 50 watt lamp is provided with a high intensity power source adapter, it is found that the lamp usually is burned out after less than two minutes of such high intensity use. Obviously, to interrupt the procedure in order to change a lamp because of failure is most unfortunate and undesirable.

Another significant disadvantage of microscope illumination systems known heretofore utilizing tungsten filament lamps is slow dissipation of heat. Especially problematic is the hot lamp housing which will cause burning, melting or fusion of a drape normally used over the surgical area in order to maintain sterility and prevent contamination of the field. However, when the drape comes in contact with the hot lamp housing, burning of the drape is obviously most unfortunate, not only from loss of field sterility because of exposure to the ambient surroundings when the drape integrity is interrupted, but danger of fire, noxious fumes from melting plastic, and even injury to the patient or surgeon from molten or burning drape material are of concern. In order to reduce or eliminate such heat problems, there are fiber optic illumination systems for operation microscopes. Although they provide a cool light source thereby obviating the problems previously described, the very nature of a fiber optic system results in significant lamp intensity loss between the 150 watt halogen bulb normally used. Not only is low intensity a problem but the resulting color spectrum from the lamp is unsuitable for use with easily available film such as high speed Ektrachrome 150, for recording the procedure. In other words, color distortion from the fiber optics does not yield desirable or acceptable film reproductions of the operation, let alone, sufficient light for color filming, televising or video tape recording.

SUMMARY OF THE INVENTION

It is an object of the present invention to provide a high intensity light for a standard operation microscope. It is a further object to provide a lamp assembly which will give superior light within a suitable color spectrum and to allow for color video tape recording of surgeries, especially microsurgical procedures such as microvascular and microneurosurgery and the like.

The present invention utilizes a tungsten filament-halogen 250 watt high intensity lamp in an assembly readily adaptable for existing microscopes of the type previously described. The assembly includes means for cooling the lamp whereby danger of burning or fusing a drape as previously described is obviated. Moreover, the lamp provides long life, especially at high intensity as compared to relatively short life of the previously known and used illumination systems. Moreover, the illumination system of the present invention may incorporate means for varying the lamp intensity to suit selected procedures, all offering light within the color spectrum desirable to achieve superior filming or color video tape recording. These objects of the present invention as well as more detailed characteristics of the assembly will be explained in the following detailed description.

DETAILED DESCRIPTION OF THE INVENTION

Figure 1:
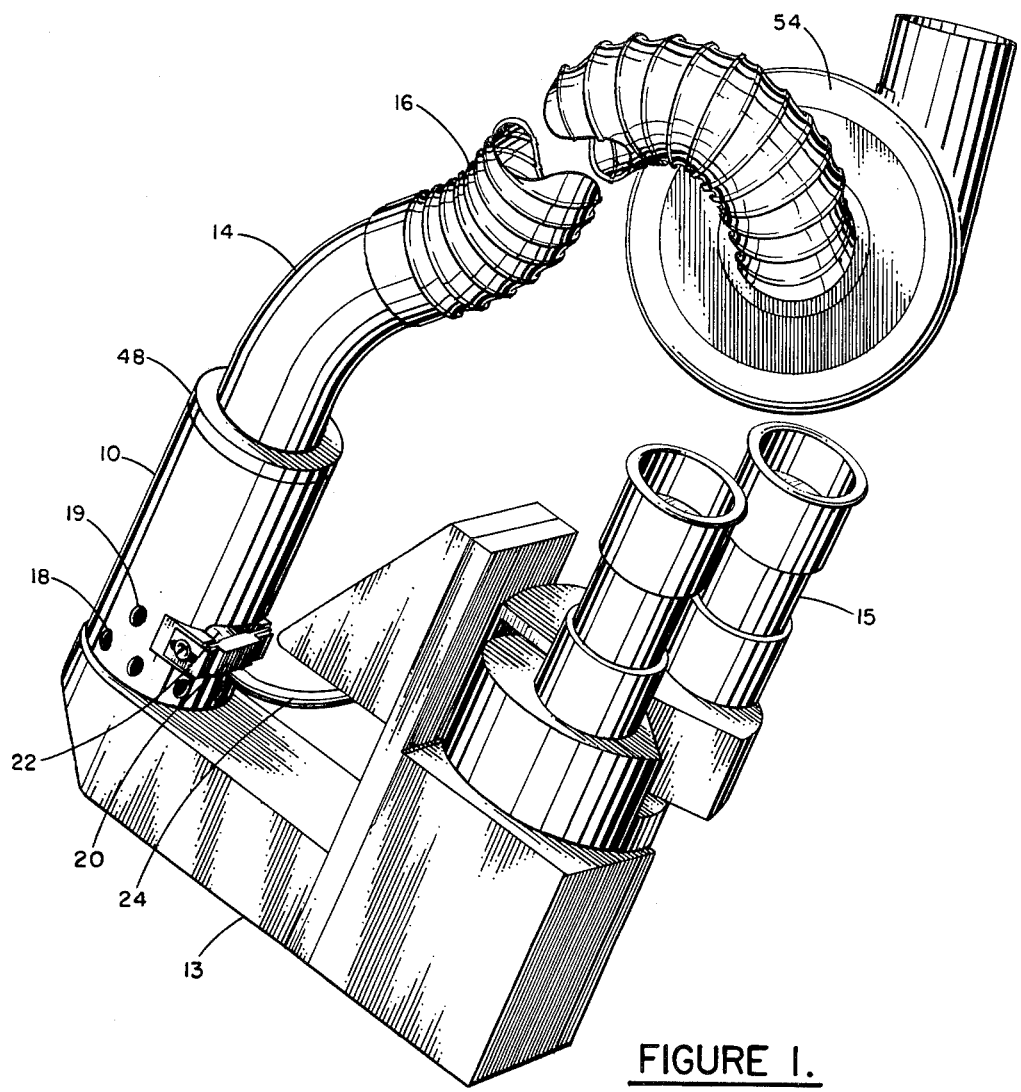
FIG. 1 is a partial view of an operation microscope incorporating the lamp assembly of the present invention.
Figure 3:
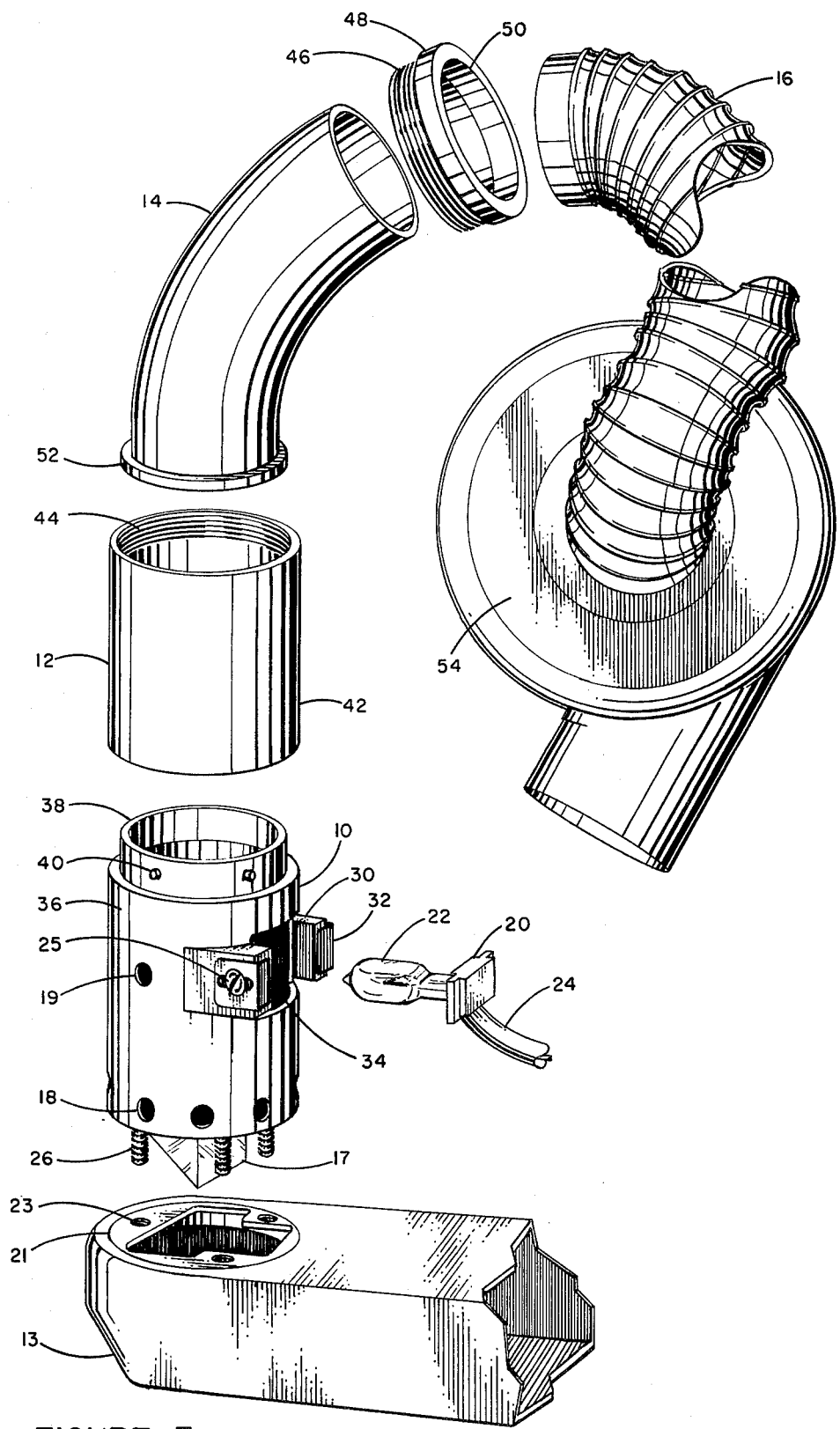
FIG. 3 is an exploded view illustrating the components of the lamp assembly of the present invention.

Referring to the Figures, there is shown a portion of a conventional operation microscope including binocular tubes 15 and filter housing 13 on which the assembly of the invention is mounted. FIG. 3 specifically illustrates an opening 21 through which prism 17 extends and having a plurality of threaded orifices 23 for receiving threadedly engaging screws 26 to secure lamp housing member 10 thereto. FIG. 1 illustrates the lamp housing member so secured with upper housing member 12 mounted on the lower housing member.

Figure 2:
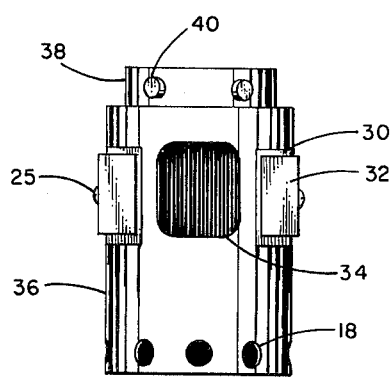
FIG. 2 is an elevational view of the lamp housing member of the assembly.

Referring also to FIG. 2, the lamp housing member, in an embodiment shown, utilizes a lower housing portion 36 having an opening 34 for receiving lamp 22. The interior of the housing portions is hollow and in the lower portion prism 17 and light condensing lens (not shown) are attached for directing illumination through filters within the filter housing 13 and mirrors within the microscope to the field of view observed through the binoculars. The lamp housing member includes a plurality of lower orifices 18 which extend through housing member walls and into the interior chamber. The location of these orifices is important in relationship to the location of lamp 22 within the lamp housing member since air is drawn through the orifices and past the lamp in order to cool it. Thus, the lower orifices 18 are below the plane of the lamp as it is positioned in the lamp housing member. Moreover, although their number is not particularly critical, the orifices should be of a size and quantity to provide enough air to be drawn therethrough and past the lamp in order to achieve sufficient cooling. For example, preferably six or more of such lower orifices are used, each having a nominal diameter of about 3 milimeters. In addition, one or more upper orifices 19 may also be present in the lamp housing wall, preferably at approximately the same plane as the lamp. However, the size and number of the upper openings is not so critical.

Lamp 22 is mounted on lamp base 20 which base is provided with a female socket for the lamp. A power supply cord 24 is also secured to the lamp base for being plugged into a suitable electrical outlet or other power supply source including a transformer. A variable transformer for varying the power directed to the lamp thus allowing for selection of different lamp intensity may be used. Such a transformer, for example, may vary the lamp intensity from 100 to 250 watts, and may have a continuous rheostat for selecting any intensity between low and high. Other transformers may use specific designated power output selections. In either case, the use of such a transformer with the assembly will allow the lamp intensity to be varied over a range of illuminations any one of which may be selected depending on the surgical procedure or high intensity requirement where color television or video recording or filming is desired.

Opening 34 in the lamp housing member portion 36 is for receiving lamp 22 in the sleeve-like housing. Brackets 32 on each side of the opening may be tightened by screws 25 for the purpose of securing lamp base 20 once the lamp is in place in the housing as illustrated in FIG. 1. Thus, utilizing screws 25, the brackets, which pivotally engage extension arms 30 on each side of the lamp housing member, adjacent opening 34, can be loosened, the brackets pivoted, and the lamp base removed. The lamp may then be replaced and a fresh lamp inserted in the housing opening, the brackets brought into position so as to abut the lamp housing, and the screws 25 tightened. However, it will be understood that such a means of securing the lamp and lamp base in the lamp housing member is shown for illustration only and any other suitable or equivalent means of so securing the lamp therein may be used.

In the embodiment shown, in FIG. 3, the lamp housing member comprises a lower housing portion 36 and upper housing portion 12. Where such a two lamp housing portion embodiment is used, portions may be screwed together by any suitable means such as bolts, screws, threaded engagement, and the like. The means illustrated comprises the use of lock projections 40 extending from rim 38 at the upper end of the lower housing member. The rim will project into the upper housing portion which comprises a hollow sleeve 42 having slots or detents adjacent its bottom or lower edge for receiving the lock projections. Thus, the upper housing member portion can be removed by simply twisting it relative to the lower housing portion and whereby these two components may be separated. FIG. 1 shows a single lamp housing member 10 otherwise having the features described and shown in FIG. 3.

The assembly of the invention includes a conduit extending between air blower or fan 54 and the lamp housing member. The purpose of the blower is to draw air, utilizing a vacuum principle, through orifices 18 and 19 in the lamp housing, past the lamp to cool it, through the conduit and out the fan or blower. A flexible conduit 16 is preferably used, such as a large bore corrugated medical tubing.

In the preferred embodiment shown, the assembly also includes an angled pipe or elbow 14 which is secured to upper lamp housing portion 12. The latter is provided with an adapter 48, having a threaded skirt 46 for threadedly engaging the upper end 44 of the lamp housing member. The adapter has an opening 50 through which the angled pipe extends and which pipe has a flange 52 having an outside dimension greater than the opening 50 of the adapter. Thus, the angled pipe can be secured by placing the adapter over the pipe flange and threadedly securing it to the upper lamp housing portion. Flexible hose 16 is secured to the opposite angled pipe end and to the blower or fan 54. The purpose of the preferred angled pipe embodiment is so that the pipe and hose can be directed away from the surgeon or in any direction desired. Other equivalent means of securing the angled pipe on either lamp housing embodiment shown may be used.

The blower or fan may be any suitable device which has the capacity of drawing or pulling sufficient volumes of air through the orifices and past the lamp to maintain the lamp temperature low enough to prevent premature lamp failure, as well as to constantly remove the heat from the immediate microscope vicinity. Without such cooling, the lamp housing would become extremely hot and significantly heat the draped or otherwise confined area in which the surgeon is usually working. A hot lamp housing is not only uncomfortable for the surgeon working in the confined and covered area, but may also cause burning of the drape and other disadvantages as previously mentioned which the present invention is intended to obviate. The fan or blower is placed at any convenient location on or adjacent the apparatus so long as it directs the hot air from the lamp housing into the atmosphere and away from the microscope area. Preferably, the blower will be electrically attached to a switch or switching means whereby it will automatically be turned on when the lamp is on and for a while after the lamp is turned off so as to continue to cool the lamp until it has reached a selected temperature. This may be accomplished by electrical switching, timers or temperature sensing means for turning the blower on and off and coordinating with means for energizing the lamp.

The lamp housing components may be made of any suitable material able to withstand the temperatures to which it will be subjected due to the lamp heat, preferably heat resistent plastics. In some instances metals which will be good heat conductors may be preferred so as to dissipate the lamp heat as rapidly as possible. These same materials may also be used for the angled pipe with specific materials being selected by those skilled in the art.

It will be evident that the microscope lamp assembly of the present invention offers significant advantages in providing adequate light for deep microsurgical procedures and which is suitable for television or video recording, unlike systems known heretofore. The device is simple both in construction and operation thus achieving the advantages set forth herein as well as others evident to those skilled in the art.

I claim:

1. In an operation microscope the improvement comprising a high intensity illumination lamp assembly comprising:
   a. a high intensity lamp secured in a lamp housing member;
   b. a lamp base member on which said lamp is mounted, and an electrical supply cord for said lamp;
   c. a lamp housing member having a cavity for receiving said lamp, a plurality of orifices communicating between the cavity and exterior thereof, an opening through which said lamp extends and means for mounting said lamp;
   d. a fan for drawing air through said housing member orifices and cavity for cooling said lamp; and
   e. a conduit extending between said housing member and said fan comprising an angled pipe member and a flexible hose, said pipe secured to said base member and said hose extending between said pipe and said fan.

2. The assembly of claim 1 wherein said lamp comprises a 250 watt lamp.

3. The assembly of claim 2 wherein said lamp comprises a tungsten halide lamp.

4. The assembly of claim 3 including means cooperating with said lamp for selecting the intensity thereof.

5. The assembly of claim 1 including means for varying the direction at which said angled pipe extends from said housing member.

6. The assembly of claim 5 wherein said varying means comprises an adjustable adapter on said housing member having an opening through which said angled pipe extends and means at one end of said pipe for being adjustably secured by said adapter.

7. The assembly of claim 1 wherein said orifices are located below the secured lamp.

* * * * *